(12) United States Patent
Kinzer et al.

(10) Patent No.: US 9,114,729 B2
(45) Date of Patent: Aug. 25, 2015

(54) SEAT RAIL FOR A VEHICLE SEAT OF A MOTOR VEHICLE AND RETAINING ARRANGEMENT OF A RETAINING ELEMENT OF A VEHICLE SEAT ON A SEAT RAIL

(75) Inventors: Andreas Kinzer, Homburg (DE);
Joachim Mühlberger, Obersülzen (DE);
Jürgen Nasshan, Kaiserslautern (DE);
Peter Probst, Waiblingen (DE); Boris Willems, Schmelz (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 0 days.

(21) Appl. No.: 13/995,928

(22) PCT Filed: Nov. 12, 2011

(86) PCT No.: PCT/EP2011/005706
§ 371 (c)(1),
(2), (4) Date: Aug. 5, 2013

(87) PCT Pub. No.: WO2012/084094
PCT Pub. Date: Jun. 28, 2012

(65) Prior Publication Data
US 2014/0292018 A1    Oct. 2, 2014

(30) Foreign Application Priority Data

Dec. 21, 2010    (DE) .......................... 10 2010 055 364

(51) Int. Cl.
*B60N 2/015*    (2006.01)
*B60N 2/04*    (2006.01)
*B60N 2/28*    (2006.01)
*B60N 2/07*    (2006.01)

(52) U.S. Cl.
CPC ............ *B60N 2/015* (2013.01); *B60N 2/01575* (2013.01); *B60N 2/0722* (2013.01); *B60N 2/28* (2013.01); *B60N 2/0715* (2013.01)

(58) Field of Classification Search
CPC ............... B60N 2/005; B60N 2/01508; B60N 2/01591; B60N 2/04; B60N 2/06; B60N 2/0707; B60N 2/0715; B60N 2/28; B60N 2/01575
USPC ...................... 296/65.01, 65.03, 65.13, 65.14; 297/331, 344.11
See application file for complete search history.

(56) References Cited

U.S. PATENT DOCUMENTS 6,036,252 A    3/2000    Hecksel
6,056,346 A *  5/2000    Smuk ......................... 296/65.03
(Continued)

FOREIGN PATENT DOCUMENTS

DE    200 19 891 U1    5/2001
FR    2771350 A1    5/1999

OTHER PUBLICATIONS

International Search Report in PCT/EP2011/005706 dated Jan. 27, 2012.
(Continued)

*Primary Examiner* — Jason S Daniels
(74) *Attorney, Agent, or Firm* — Foley & Lardner LLP (57) ABSTRACT

A seat rail for a vehicle seat of a motor vehicle, including a seat rail profiled element, which has at least one profile region into which at least one corresponding retaining element of the vehicle seat can be inserted in at least one retaining position. The seat rail includes at least one ramp element extending at an angle from the longitudinal extension of the seat rail profiled element, by which ramp element the retaining element can be moved out of the profile region from the retaining position to at least one removal position by moving the retaining element along the ramp element.

8 Claims, 5 Drawing Sheets

(56) References Cited

U.S. PATENT DOCUMENTS 6,059,345 A * 5/2000 Yokota ................. 296/65.14
2010/0117393 A1 * 5/2010 Yamashita et al. .......... 296/37.8

OTHER PUBLICATIONS

Notification of Transmittal of Translation of the International Preliminary Report on Patentability dated Jul. 4, 2013 received in International Application No. PCT/EP2011/005706.

* cited by examiner

SEAT RAIL FOR A VEHICLE SEAT OF A MOTOR VEHICLE AND RETAINING ARRANGEMENT OF A RETAINING ELEMENT OF A VEHICLE SEAT ON A SEAT RAIL

CROSS REFERENCE TO RELATED APPLICATIONS

The present application is a National Stage of International Application No. PCT/EP2011/005706 filed on Nov. 12, 2011, which claims the benefit of German Patent Application No. 10 2010 055 364.6 filed on Dec. 21, 2010, the entire disclosures of which are incorporated herein by reference.

The invention relates to a seat rail for a vehicle seat of a motor vehicle of the type set out in the preamble of patent claim 1 and a retaining arrangement of a retaining element of a vehicle seat on a seat rail of the type set out in the preamble of patent claim 4.

It is known from the industrial construction of motor vehicles to retain a vehicle seat on the bodywork of the motor vehicle by means of at least one seat rail. By means of the seat rail, the vehicle seat can be locked on the seat rail in a plurality of various longitudinal positions in the longitudinal direction of the vehicle and on the seat rail in the vertical direction of the vehicle.

Particularly in the case of vans, it is known that such a vehicle seat can be released from the seat rail and removed from a passenger compartment in order, for example, thus to increase the storage space. The seat rail is released and the vehicle seat is removed at least substantially in the vertical direction of the vehicle, which involves operating comfort which is in need of improvement.

Therefore, an object of the present invention is to provide a seat rail for a vehicle seat of a motor vehicle and a retaining arrangement of a retaining element of a vehicle seat on a seat rail which allow improved operating comfort.

This object is achieved by a seat rail for a vehicle seat of a motor vehicle having the features of patent claim 1 and a retaining arrangement of a retaining element of a vehicle seat on a seat rail having the features of patent claim 4. Advantageous embodiments with advantageous and non-trivial developments of the invention are set out in the remaining claims.

The first aspect of the invention relates to a seat rail for a vehicle seat of a motor vehicle, in particular a private motor vehicle, having a seat rail profile which has at least one profile region in which at least one corresponding retaining element of the vehicle seat can be introduced in at least one retaining position.

There is provision according to the invention for the seat rail to comprise at least one ramp element which extends obliquely relative to the longitudinal extent of the seat rail profile and by means of which the retaining element can be moved into at least one removal position by the retaining element being moved along the ramp element from the retaining position, out of the profile region. By means of that ramp element, the retaining element and therefore the entire vehicle seat can be moved in a particularly comfortable manner into and out of the profile region. It is simply necessary to apply to the retaining element or the vehicle seat a force whose direction of action extends at least substantially parallel with the seat rail. It is therefore unnecessary to introduce force to the vehicle seat at least substantially in the vertical direction of the vehicle in order to move it out of or into the profile region. In other words, a user of the motor vehicle does not have to lift the vehicle seat out of or into the profile region at least substantially in the vertical direction of the vehicle. Instead, the retaining element and therefore the entire vehicle seat can be moved, in particular pushed, out of and into the profile region by the seat rail according to the invention in a particularly simple and comfortable manner and therefore with a particularly high level of operating comfort.

Thus, it is readily possible, by means of the seat rail according to the invention, to release the retaining element and therefore the entire vehicle seat from the seat rail in a particularly simple manner and to move it out of a passenger compartment of the motor vehicle in order to increase the storage space in the passenger compartment. It is also possible to bring the detached and disassembled seat back into active connection with respect to the seat rail in a particularly easy and comfortable manner by means of the retaining element and thereby to mount and lock the vehicle seat in the passenger compartment so that it is retained substantially in the vertical direction of the vehicle via the seat rail according to the invention.

The seat rail according to the invention preferably allows a so-called longitudinal displacement of the vehicle seat. This means that the seat can be displaced between a plurality of positions at least substantially in the longitudinal direction of the vehicle and can be locked in those positions on the seat rail in the longitudinal direction of the vehicle and in the vertical direction of the vehicle. It is thereby possible to find a comfortable seat position for a seat occupant.

In an advantageous embodiment of the invention, the retaining element comprises at least one roller which can be rotated about an axis of rotation and by means of which the retaining element and thereby the vehicle seat can roll at least indirectly on the seat rail profile. It is thereby possible for the vehicle seat to be moved in a particularly comfortable manner which places only a mild strain on the back of the user, because the user does not have to lift the entire weight of the vehicle seat, in order to move the seat into the removal position or from the removal position into the retaining position. This is particularly advantageous because a vehicle in which the vehicle seat is arranged rarely has a corresponding height which allows the user to stand upright.

Another advantage of the seat rail according to the invention is that a position of the retaining element relative to the seat rail does not have to be searched for in a time-consuming manner in order to remove the vehicle seat from the seat rail. Instead, the vehicle seat and therefore the retaining element can be moved simply by being moved along the seat rail profile to the ramp element and along the ramp element into the removal position. This is advantageous because the ramp element and therefore a removal position at which the vehicle seat can be removed from the seat rail is arranged, at least practically at all times and at least in regions, below the vehicle seat and consequently cannot be viewed by the user or the user cannot, for example, always see when the removal position is reached.

The roller described above further affords the advantage that the seat can also be maneuvered and moved particularly readily outside the motor vehicle and when it is in the removal position on the seat rail profile. If the vehicle seat is in the removal position, it can be moved along the seat rail profile and moved out of the motor vehicle via the roller in a particularly simple manner. The same advantages described in relation to the removal of the vehicle seat are achieved when the seat is introduced and brought into active connection with respect to the seat rail via the retaining element owing to the seat rail according to the invention because the vehicle seat can also be moved in a particularly simple and comfortable manner during installation, in particular in the case of re-installation, in the passenger compartment. The removal position, via which the vehicle seat is also mounted on the seat rail again, can be found particularly easily and the weight of the vehicle has to be moved at least partially only via the roller.

The second aspect of the invention relates to a retaining arrangement of a retaining element of a vehicle seat on a seat rail which comprises a seat rail profile, in particular a seat rail according to the invention, of a motor vehicle, in which the retaining element is introduced in a profile region of the seat rail profile in at least one retaining position.

According to the invention, there is provided at least one ramp element by means of which the retaining element can be moved into at least one removal position by moving it along the ramp element from the retaining position out of the profile region. Advantageous embodiments of the first aspect of the invention are intended to be considered to be advantageous embodiments of the second aspect of the invention, and vice versa.

Similarly to the seat rail according to the invention, the retaining arrangement according to the invention also allows particularly simple disassembly and installation of the vehicle seat in a passenger compartment of a vehicle, in particular of the motor vehicle, the vehicle seat not having to be lifted or held by a user at least substantially in the vertical direction of the vehicle for installation or disassembly. In order to move the seat into the removal position, it is simply necessary to press and/or pull the seat along the seat rail profile, whereby it is moved into the removal position in a quasi-automatic manner via the ramp element. In the removal position, the vehicle seat is at a higher vertical level in the vertical direction of the vehicle than in the retaining position. In other words, the vehicle seat is moved upwards during its movement from the retaining position into the removal position in the vertical direction of the vehicle, that is to say, in the direction of a roof (which may be present) of the motor vehicle, or, vice versa, the vehicle seat is moved in the direction of a floor of the motor vehicle during its movement from the removal position into the retaining position in the vertical direction of the vehicle. It is thereby apparent that both the retaining arrangement according to the invention and the seat rail according to the invention allow the vehicle seat to be moved, in particular in the vertical direction of the vehicle, in a particularly simple manner which is easy for the user, without the user having to lift or lower the vehicle seat at least substantially in the vertical direction of the vehicle. The retaining arrangement according to the invention therefore allows in particular actuation of the vehicle seat which particularly places only a mild strain on the back, in particular when the seat is removed from the seat rail or when it is brought into active connection with the seat rail.

Other advantages, features and details of the invention will be appreciated from the following description of one preferred embodiment and with reference to the drawings. The features and feature combinations set out above in the description and the features and feature combinations mentioned below in the description of the figures and/or shown only in the figures can be used not only in the combination set out but also in other combinations or alone without departing from the scope of the invention. In the drawings.

Figure 1:
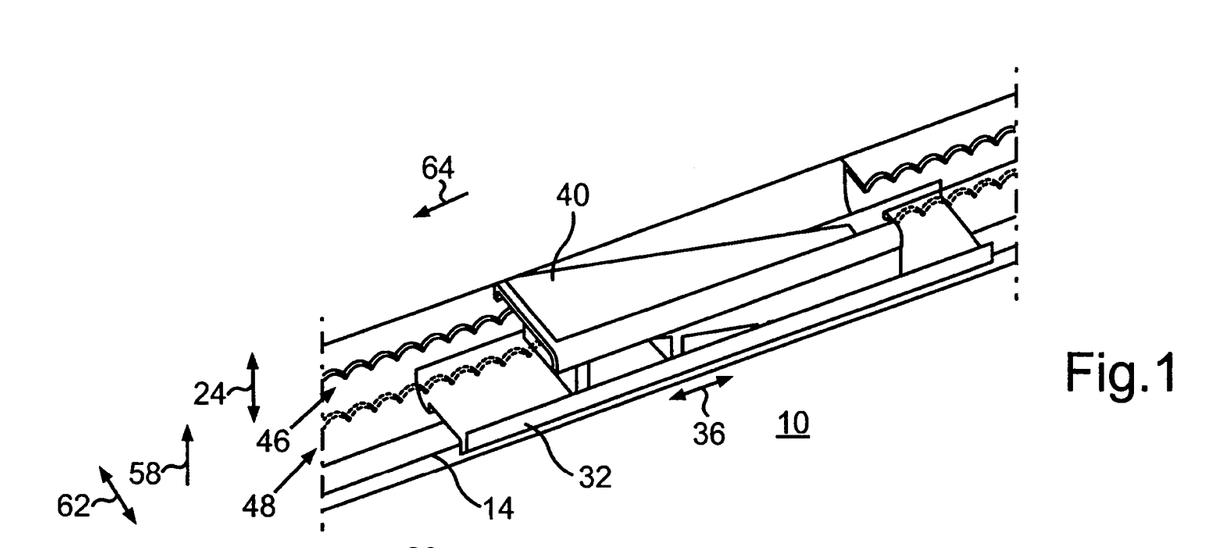
FIG. 1 is a schematic perspective cutout of a seat rail for a vehicle seat of a motor vehicle, having a seat rail profile and having a ramp element which extends obliquely relative to the longitudinal extent of the rail profile and by means of which a retaining element of the vehicle seat and therefore the vehicle seat can be moved into a removal position by moving the retaining element or the vehicle seat along the ramp element at least substantially in the vertical direction of the vehicle.
Figure 2:
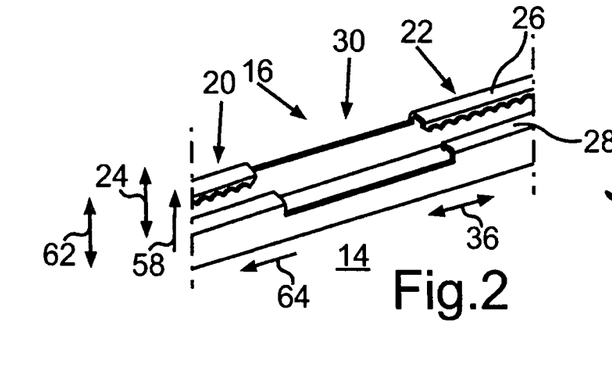
FIG. 2 is a cutout of the seat rail profile according to FIG. 1.
Figure 3:
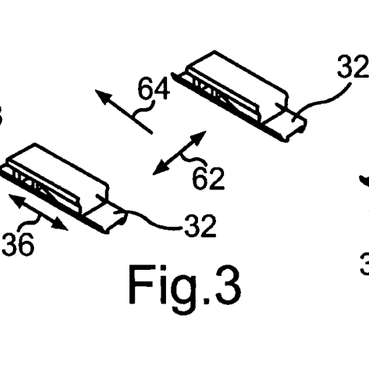
FIG. 3 shows a ramp element for a left-side seat rail and a ramp element for a right-side seat rail according to FIG. 1.
Figure 4:
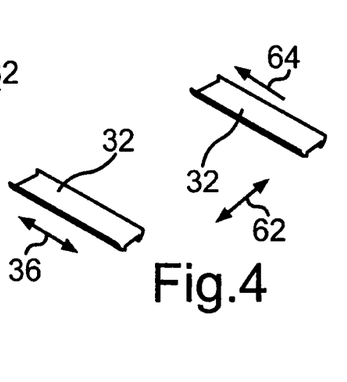
FIG. 4 shows a bridge for a left-side seat rail and a bridge for a right-side seat rail according to FIG. 1.

FIG. 1 shows a seat rail 10 for a vehicle seat 12 (FIGS. 5 to 12) which comprises a seat rail profile 14 which is also illustrated in FIG. 2. The seat rail profile 14 comprises a profile region 16 in which a retaining element 18 (FIGS. 8 to 12) of the vehicle seat 12 can be introduced. In part-regions 20 and 22, the profile region 16 has a receiving member which is upwardly closed in a vertical direction of the seat rail 10 according to a direction arrow 24 and therefore in the vertical direction of the vehicle. As can particularly be seen from FIGS. 10 and 12, the seat rail profile 14 which is constructed, for example, from metal or plastics material, further has walls 26 and 28 which are constructed at least substantially in a U-like manner, the U-like shape having two members which extend at least substantially parallel with each other and a member which is transverse thereto and connects those members, with the transversely extending member covering the receiving member in an upward direction and therefore closing it. It is thereby possible for the vehicle seat 12 to be able to be locked or to be locked on the seat rail 10 via the retaining element 18 at least substantially in the vertical direction of the vehicle.

A removal opening 30, via which the vehicle seat can be removed from the seat rail 10 and can thereby be moved from a passenger compartment of a vehicle, in particular a private motor vehicle, is provided between the part-regions 20 and 22. As can be seen in FIG. 2, the members 26 and 28 are not provided in the longitudinal direction of the seat rail profile 14 according to a direction arrow 36 which corresponds at least substantially to the longitudinal direction of the vehicle so that the retaining element 18 and therefore the vehicle seat 12 can be removed from the seat rail 10.

The seat rail 10 comprises a bridge element 32 which is arranged in the seat rail profile 14. The bridge element 32 provides an at least substantially planar rolling face 37 and lateral guides 38 for lower rollers 34 of the retaining element 18.

The seat rail 10 further comprises a ramp element 40. As can be seen in FIG. 1, the ramp element 40 extends obliquely relative to the longitudinal extent of the seat rail profile 14 according to the direction arrow and is arranged on the bridge element 32 in the region of the removal opening 30 in a vertical direction.

Figure 9:
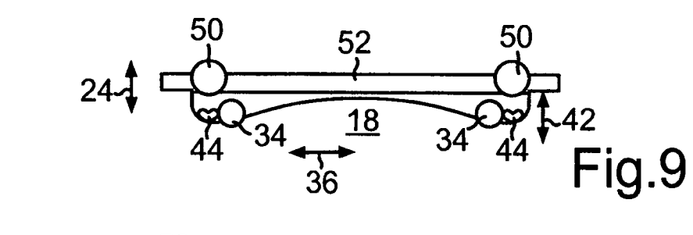
FIG. 9 is a schematic side view of the retaining element according to FIG. 8 which is unlocked.
Figure 10:
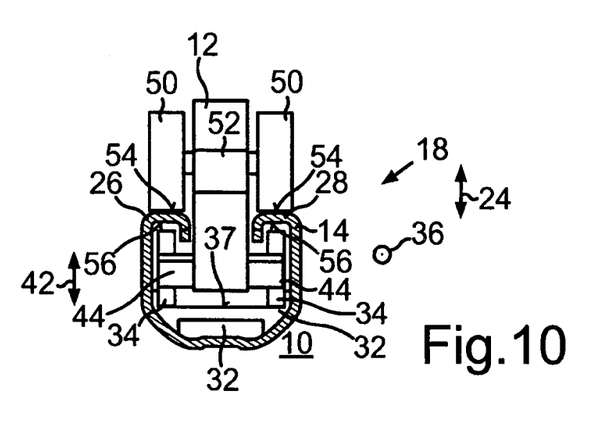
FIG. 10 is a schematic cross section of the unlocked retaining element according to FIG. 9, which is introduced into a seat rail according to FIG. 1 and which is connected to a vehicle seat of the retaining arrangement according to FIGS. 5 to 7.
Figure 11:
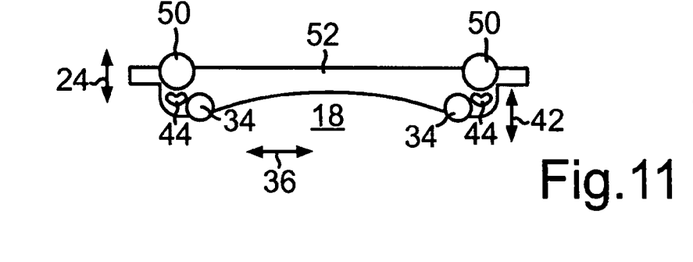
FIG. 11 is a schematic side view of the retaining element according to FIG. 8 which is locked and FIG. 12 is a schematic cross section of the locked retaining element according to FIG. 11 which is introduced into a seat rail according to FIG. 1 and which is connected to a vehicle seat of the retaining arrangement according to FIGS. 5 to 7.
Figure 12:
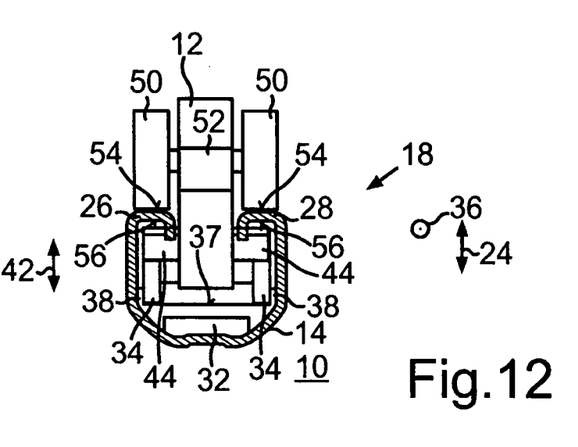

As can be seen particularly in FIGS. 8 to 12, the retaining element 18 comprises engaging elements 44 which can be moved in a vertical direction according to a direction arrow 42 and which can be moved between an unlocking position shown in FIGS. 9 and 10 and a locking position shown in FIGS. 11 and 12. As can be seen in FIG. 12, the engaging elements 44 cooperate with wave-like profiles 46 and 48 of the seat rail profile in the locking position so that the retaining element 18 and therefore the vehicle seat 12 is locked in the longitudinal direction of the seat rail 10 according to a direction arrow 36 and therefore in the longitudinal direction of the vehicle. It is thereby also possible to displace the vehicle seat 12 between a plurality of positions in the longitudinal direction of the vehicle so that a seat position which is pleasant for an occupant of the vehicle seat 12 can be adjusted.

In the unlocking position, the engaging elements 44 do not cooperate with the wave-like profiles 46 and 48 so that the retaining element 18 and therefore the vehicle seat 12 can be moved in the longitudinal direction of the seat rail 10 according to the direction arrow 36 and therefore in the longitudinal direction of the vehicle.

In order to be able to move the vehicle seat 12 particularly easily and therefore comfortably in the longitudinal direction according to the direction arrow 36, the retaining element 18 comprises upper-side rollers 50 which are arranged at least in regions above the rollers 34 in the vertical direction according to the direction arrow 24. Similarly to the rollers 34, the rollers 50 are also arranged on a base member 52 of the retaining element 18 in a rotatable manner about an axis of rotation, respectively, the axes of rotation of the rollers 50 being arranged in a vertical direction according to the direction arrow 24 above the axes of rotation of the rollers 34. The retaining element 18 rolls on the seat rail profile 14 when the vehicle seat 12 moves in the longitudinal direction according to the direction arrow 36. To that end, the walls 26 and 28 provide surfaces 54 which act as rolling surfaces. As can be seen particularly in FIGS. 10 and 12, the surfaces 54 are arranged opposite surfaces 56 of the walls 26 and 28, the surfaces 54 and 56 being formed by the member of the U-shape extending transversely relative to the members which extend at least substantially parallel with each other.

As can also be seen particularly in FIGS. 10 and 12, both the engaging elements 44 and the lower-side rollers 34 serve to lock, in particular in the part-regions 20 and 22 of the seat rail profile 14, the retaining element 18 and therefore the vehicle seat 12 on the seat rail 10 in a vertical direction according to the direction arrow 24 and therefore in the vertical direction of the vehicle. To that end, the rollers 34 and the engaging elements 44 are covered at least in regions by the walls 26 and 28 and are further received at least in regions in the receiving member of the part-regions 20 and 22. In other words, the rollers 34 and the engaging elements 44 prevent the retaining element 18 from being withdrawn from the seat rail profile 14 because the engaging elements 44 and the rollers 34 would come into contact with the walls 26 and 28 if the vehicle seat were to be moved with the retaining element 18 in a vertical direction according to the direction arrow 24 in an upward direction according to a direction arrow 58 and if at least the rollers 34 and/or some of the engaging elements 44 were to be in the part-region 20 or the part-region 22 of the seat rail profile 14.

The removal opening 30 is provided to allow such removal of the vehicle seat 12 and the retaining element 18. If the retaining element 18 is moved along the seat rail 10 according to the direction arrow 36 in such a manner that the rollers 34 and the engaging elements 44 are in the region of the removal opening 30 and are no longer upwardly covered in a vertical direction by the walls 26 and 28, the retaining element 18 can be removed from the seat rail profile and the vehicle seat 12 can be disassembled from the passenger compartment. Vice versa, it is possible to introduce the retaining element 18 into the seat rail profile 14 again by the rollers 34 and the engaging elements 44 being introduced via the removal opening 30 into the seat rail profile 14 and therefore into the profile region 16. If the vehicle seat 12 and the retaining element 18 are then moved in a longitudinal direction according to the direction arrow 36 so that the engaging elements 44 and/or the rollers 34 are covered in an upward direction at least in regions or partially by the walls 26 and 28, the vehicle seat 12 is again locked via the retaining element 18 on the seat rail 10 at least in the vertical direction of the vehicle according to the direction arrow 24 and can no longer be removed from the seat rail profile 14 and therefore from the profile region 16.

Figure 5:
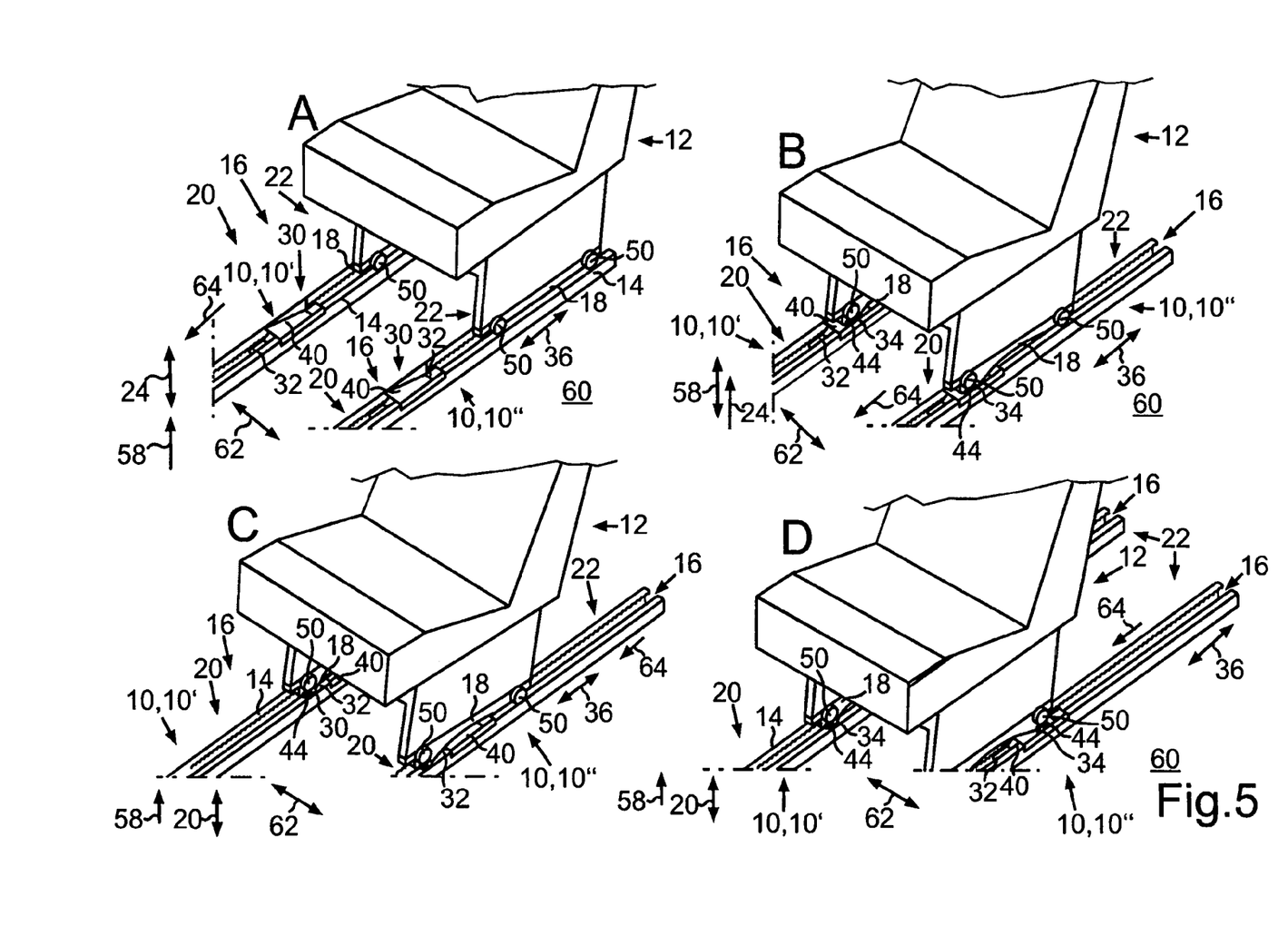
FIG. 5 comprises (in cutout form) four schematic perspective views of a retaining arrangement of a vehicle seat on a left-side and a right-side seat rail according to FIG. 1, respectively, with the vehicle seat being moved from a retaining position into a removal position.
Figure 6:
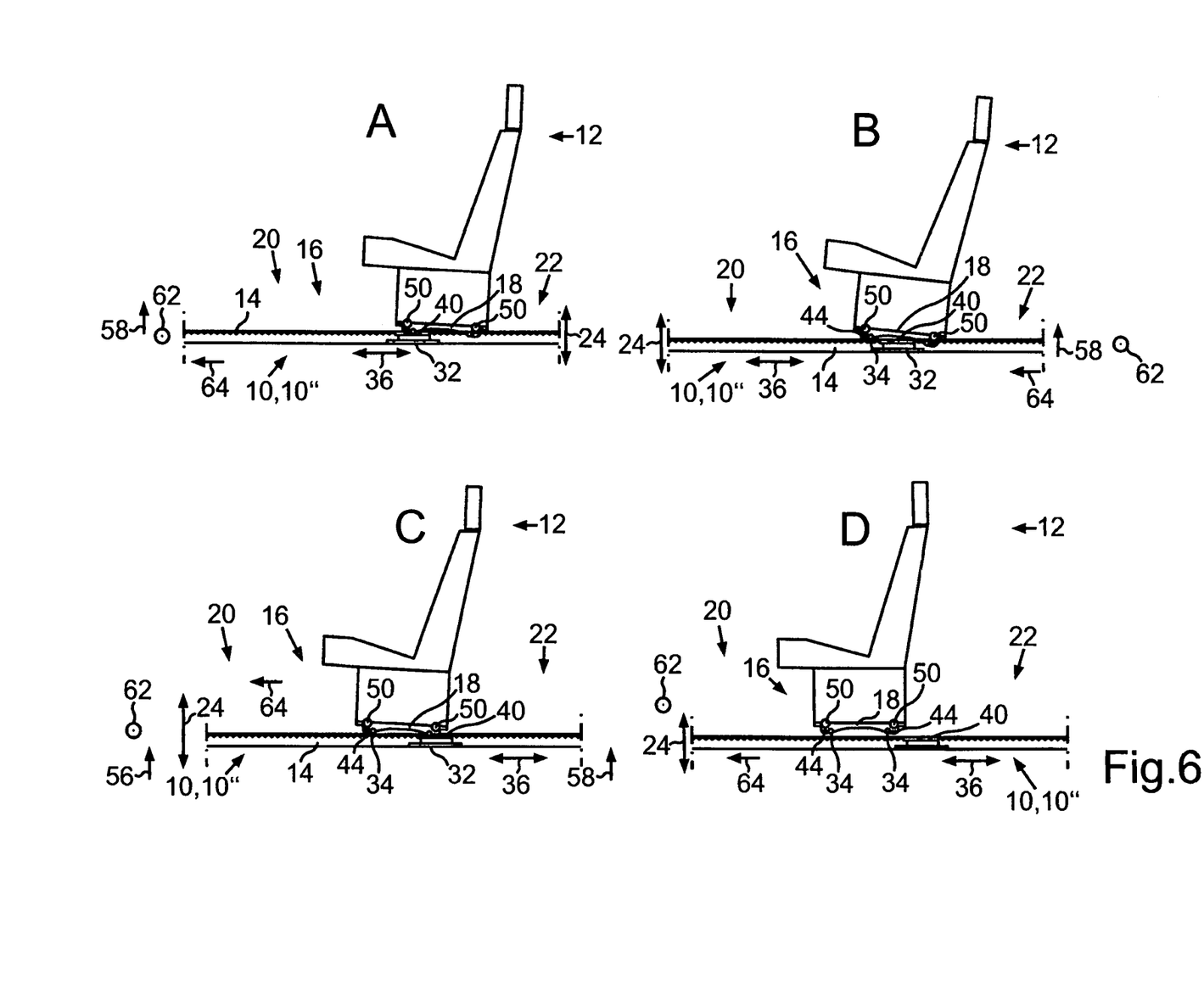
FIG. 6 comprises four schematic side views of the retaining arrangement according to FIG. 5.
Figure 7:
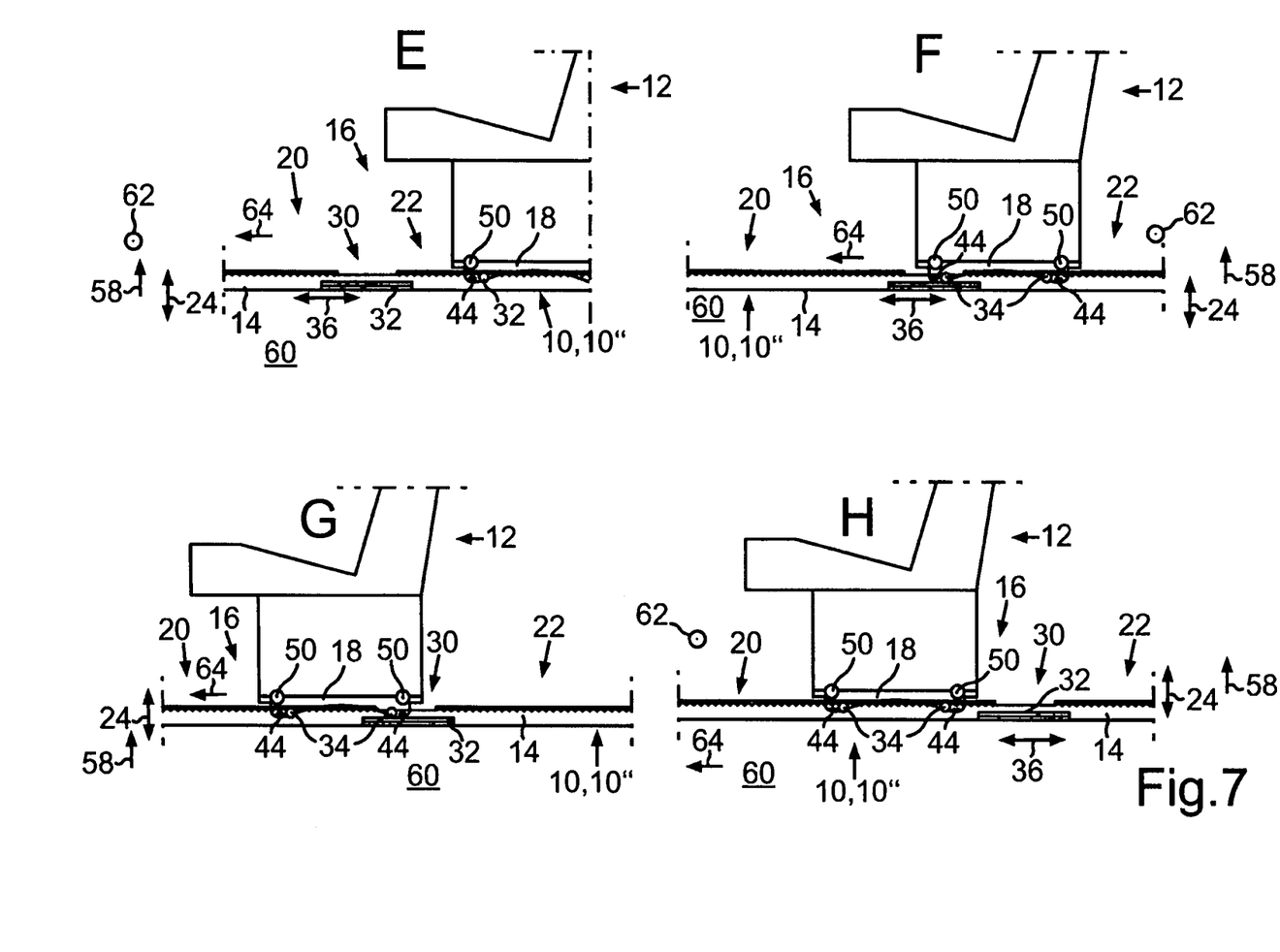
FIG. 7 comprises (in cutout form) four schematic side views of the retaining arrangement according to FIGS. 5 and 6, with the vehicle seat being moved along the seat rails.
Figure 8:
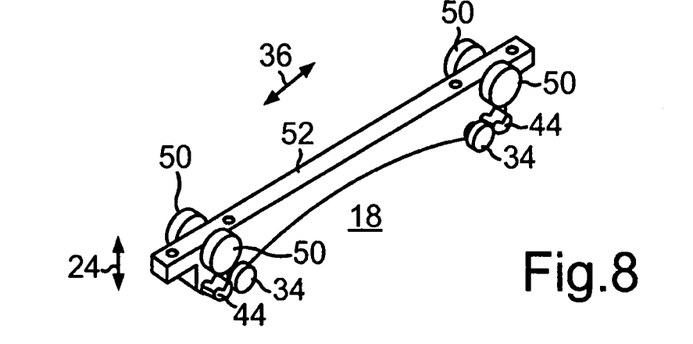
FIG. 8 is a schematic perspective view of a retaining element of the vehicle seat of the retaining arrangement according to FIGS. 5 to 7.

The ramp element 32 is provided to allow that removal and introduction of the vehicle seat 12 or retaining element 18 in a particularly simple manner and with a high level of operating comfort. FIGS. 5 to 7 show a retaining arrangement 60 of the vehicle seat 12 on a right-side seat rail 10' and a left-side seat rail 10" in the transverse direction relative to the vehicle according to a direction arrow 62 in relation to a forward direction of travel according to a direction arrow 64. The seat rails 10' and 10" correspond to the seat rail 10 so that what has been set out above and what is set out below in relation to the seat rail 10 also applies to the seat rails 10' and 10".

According to Illustration A, FIG. 5 shows the vehicle seat 12 in a retaining position on the seat rail 10, in which the vehicle seat 12 cannot be removed from the seat rail 12 because the rollers 34 and the engaging elements 44 are covered by the walls 26 and 28 in an upward direction.

In order to be able to move the vehicle seat 12 out of the passenger compartment, the vehicle seat 12 is moved in a longitudinal direction according to the direction arrow 36 in the direction of the removal opening 30 of the seat rail 10, with only the rollers 50 rolling on the surfaces 54 initially.

The vehicle seat 12 is moved towards the removal opening until the rollers 34 touch the bridge element 32, where applicable, and roll on the running surface in a manner guided laterally by the guides 38. However, the rollers 34 do not necessarily have to come into contact with the bridge element 32. If the vehicle seat 12 is moved further in the direction of the removal opening 30, the rollers 34 come into contact with the ramp element 40 and can at least roll thereon.

According to Illustration B of FIG. 5, the rollers 34 roll on the ramp element 40 and are moved, as is the vehicle seat 12, upwards according to the direction arrow 58 owing to the oblique extent in a vertical direction according to the direction arrow 24 so that the rollers 50 lift off the walls 26 and 28 until finally the lower rollers 34 can roll on the surfaces 54.

According to Illustrations C and D, consequently, the vehicle seat 12 can be moved upwards according to the direction arrow 58 without a user of the motor vehicle having to lift the seat upwards in a vertical direction of the vehicle. The vehicle seat 12 can be moved further by means of the rollers 34 and in particular moved out of the passenger compartment. Outside the passenger compartment and therefore the motor vehicle, the rollers 34 further allow the vehicle seat 12 to be maneuvered and moved in a particularly simple manner.

In a similarly simple manner, the retaining element 18 can again be introduced into the seat rail profile 14, with the retaining element 18 readily being able to be rolled over the rollers 34 and the ramp element 40 into the retaining position again according to Illustration A.

FIG. 7 shows in Illustrations E, F, G and H that the vehicle seat 12 can be readily rolled away via the removal opening 30 via the retaining element 18 and the rollers 50 if the ramp element 40 of the seat rail 10 is removed. Without the ramp element 40, the rollers 34 and therefore the vehicle seat 12 are not moved upwards according to the direction arrow 58 so that the rollers 34 and the engaging elements 40 remain in the profile region 16 and therefore in the seat rail profile 14 and consequently can also be moved from the part-region 22 into the part-region 20, or vice versa, in order to constitute various positions of the vehicle seat 12 in a longitudinal direction of the vehicle according to the direction arrow 36.

The seat rail 10 may have one removal opening similar to the removal opening 30 or a plurality of removal openings similar to the removal opening 30 in order to be able to remove the vehicle seat 12 at one or more locations or to be able to introduce it into the seat rail profile 14.

The ramp element 40 is constructed, for example, as an insert member and can thereby be readily inserted or removed in the region of the removal opening 30. It is also possible for the ramp element 40 to be integrated in the seat rail 10 or the seat rail profile 14 and to be able to be moved via at least one hinge and/or in a flap-like manner in order to bring about or not to bring about (FIG. 7) the described simple removal of the vehicle seat 12 from the seat rail 10. Similarly, the bridge element 32 may also be in the form of an insert member or be integrated in the seat rail 10 or the seat rail profile 14.

Furthermore, a covering element may be provided in order to cover the removal position 30 at least in regions. This improves the optical impression of the seat rail 10 if it is not desirable to remove or introduce the vehicle seat 12 from/into the seat rail 10.

In any regard, the seat rail 10 allows the vehicle seat 12 to be moved in a vertical direction of the seat rail and therefore a vertical direction of the vehicle and therefore according to the direction arrow 24, in such a manner that a user of a motor vehicle has to apply to the vehicle seat 12 a force which only acts at least substantially in the longitudinal direction according to the direction arrow 36. The user does not have to apply to the vehicle seat 12 a force which acts at least substantially in the vertical direction and therefore in the vertical direction of the vehicle according to the direction arrow 24. In other words, the user does not have to lift or lower the vehicle seat 12 in order to introduce the vehicle seat via the retaining element 18 into the profile region 16 of the seat rail profile 14 of the seat rail 10, or correspondingly to remove it therefrom.

The invention claimed is:

1. A seat rail for a vehicle seat of a motor vehicle, comprising:
   a seat rail profile which has at least one profile region in which at least one corresponding retaining element of the vehicle seat can be introduced in at least one retaining position to retain the vehicle seat in a use position in which a user can sit in the vehicle seat, wherein the profile region is configured to at least partially cover the retaining element in an upward direction to prevent movement of the retaining element at least substantially in a vertical direction of the vehicle when in the retaining position;
   at least one ramp element which extends obliquely relative to the longitudinal extent of the seat rail profile and by which the retaining element can be moved into at least one removal position by being moved along the ramp element from the retaining position out of the profile region such that the profile region does not at least partially cover the retaining element in the upward direction,
wherein the seat rail profile and at least one ramp element are configured such that the user does not have to lift or lower any portion of the vehicle seat at least substantially in the vertical direction of the vehicle for both installation and disassembly.

2. The seat rail as claimed in claim 1, wherein the profile region has at least one receiving member which is closed upwardly at least in regions in a vertical direction of the seat rail and by which the retaining element is locked or can be locked on the seat rail profile in the retaining position in a vertical direction, wherein an additional profile region of the seat rail profile adjoins the first profile region and has a removal position, via which the retaining element can be moved into the removal position by being moved along the ramp element from the retaining position out of the receiving member of the first profile region.

3. The seat rail as claimed in claim 2, wherein the additional profile region is constructed so as to be open at the removal position in the vertical direction of the seat rail.

4. A retaining arrangement for a motor vehicle seat comprising:
   a retaining element;
   a seat rail which comprises a seat rail profile, in which the retaining element is introduced in a profile region of the seat rail profile in at least one retaining position to retain the vehicle seat in a use position in which a user can sit in the vehicle seat, wherein the profile region at least partially covers the retaining element in an upward direction to prevent movement of the retaining element at least substantially in a vertical direction of the vehicle when in the retaining position; and
   at least one ramp element by which the retaining element can be moved into at least one removal position by moving it along the ramp element from the retaining position out of the profile region such that the profile region does not at least partially cover the retaining element in the upward direction,
wherein the seat rail profile and at least one ramp element are configured such that the user does not have to lift or lower any portion of the vehicle seat at least substantially in the vertical direction of the vehicle for both installation and disassembly.

5. The retaining arrangement as claimed in claim 4, wherein the retaining element comprises at least one roller which can be rotated about an axis of rotation and by which the retaining element can be rolled at least in regions from the retaining position into the removal position.

6. The retaining arrangement as claimed in claim 5, wherein the retaining element rolls at least indirectly on the seat rail profile and/or on the ramp element during the movement from the retaining position into the removal position via the roller.

7. The retaining arrangement as claimed in claim 5, wherein the roller is covered at least in regions in the retaining position by the profile region in a vertical direction of the seat rail.

8. The retaining arrangement as claimed in claim 7, wherein the retaining element has at least one additional roller which can be rotated about an axis of rotation and by which the retaining element rolls on the profile region at least in regions during the movement along the seat rail profile at a side of the profile region facing away from the first roller.

* * * * *